US009410014B2

(12) United States Patent
Salsman

(10) Patent No.: US 9,410,014 B2
(45) Date of Patent: *Aug. 9, 2016

(54) POLYMER MANUFACTURING PROCESS

(71) Applicant: Beaulieu Group, LLC, Dalton, GA (US)

(72) Inventor: Robert Keith Salsman, Hoschton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/931,106

(22) Filed: Jun. 28, 2013

(65) Prior Publication Data

US 2013/0289222 A1    Oct. 31, 2013

Related U.S. Application Data

(63) Continuation of application No. 11/693,185, filed on Mar. 29, 2007, now Pat. No. 8,476,364.

(51) Int. Cl.
| | |
|---|---|
| *C08G 63/91* | (2006.01) |
| *C08G 18/42* | (2006.01) |
| *C09D 5/02* | (2006.01) |
| *C09D 5/03* | (2006.01) |
| *C09D 11/30* | (2014.01) |
| *C08G 18/30* | (2006.01) |
| *C08G 101/00* | (2006.01) |

(52) U.S. Cl.
CPC ............. *C08G 63/916* (2013.01); *C08G 18/30* (2013.01); *C08G 18/4252* (2013.01); *C09D 5/02* (2013.01); *C09D 5/03* (2013.01); *C09D 11/30* (2013.01); *C08G 2101/0008* (2013.01); *C08G 2101/0083* (2013.01)

(58) Field of Classification Search
CPC .................................................. C08G 63/916
USPC ....................................................... 524/599
See application file for complete search history.

(56) References Cited

U.S. PATENT DOCUMENTS

| | | | |
|---|---|---|---|
| 4,078,143 A | 3/1978 | Malik et al. | |
| 4,163,860 A | 8/1979 | Delattre et al. | |
| 4,215,032 A | 7/1980 | Kobayashi et al. | |
| 4,258,153 A | 3/1981 | Yomamoto et al. | |
| 4,355,175 A | 10/1982 | Pusztaszeri | |
| 4,439,549 A | 3/1984 | Brennan | |
| 4,469,824 A | 9/1984 | Grigsby, Jr. et al. | |
| 4,485,196 A | 11/1984 | Speranza et al. | |
| 4,578,502 A | 3/1986 | Cudmore | |
| 4,629,642 A | 12/1986 | Kernstock | |
| 4,785,060 A | 11/1988 | Nagler | |
| 4,929,749 A | 5/1990 | Gupta et al. | |
| 4,977,191 A | 12/1990 | Salsman | |
| 4,999,128 A | 3/1991 | Sonenstein | |
| 5,101,064 A | 3/1992 | Dupont et al. | |
| 5,225,130 A | 7/1993 | Deiringer | |
| 5,240,530 A | 8/1993 | Fink | |
| 5,250,333 A | 10/1993 | McNeely et al. | |
| 5,266,601 A | 11/1993 | Kyber et al. | |
| 5,319,128 A | 6/1994 | Dupont et al. | |
| 5,451,611 A | 9/1995 | Chilukuri et al. | |
| 5,503,790 A | 4/1996 | Clements | |
| 5,504,128 A | 4/1996 | Mizutani et al. | |
| 5,554,657 A | 9/1996 | Brownscombe et al. | |
| 5,578,357 A | 11/1996 | Fink | |
| 5,628,957 A | 5/1997 | Collette et al. | |
| 5,726,277 A * | 3/1998 | Salsman .................... 528/272 |
| 5,820,982 A | 10/1998 | Salsman | |
| 5,902,539 A | 5/1999 | Schmidt et al. | |
| 5,929,145 A | 7/1999 | Higgins et al. | |
| 5,948,828 A | 9/1999 | Reck | |
| 5,958,601 A | 9/1999 | Salsman | |
| 6,031,128 A | 2/2000 | Roh et al. | |
| 6,075,163 A | 6/2000 | Roh et al. | |
| 6,133,329 A | 10/2000 | Shieh et al. | |
| 6,228,479 B1 | 5/2001 | Zegler et al. | |
| 6,274,656 B1 | 8/2001 | Ma et al. | |
| 6,399,695 B1 | 6/2002 | Moriwaki et al. | |

(Continued)

FOREIGN PATENT DOCUMENTS

| | | |
|---|---|---|
| EP | 0558906 | 9/1993 |
| EP | 0558906 A1 | 9/1993 |

(Continued)

OTHER PUBLICATIONS

Andrady, Anthony L., "Plastics and the Environment," pp. 420, 430-431, and 465, John Wiley & Sons Inc., Hoboken, New Jersey (2003).
International Search Report Dated Jun. 20, 2008 for International Application No. PCT/US08/04079.
Morrison, Robert Thornton, et al., "Organic Chemistry, Second Edition," 1966, pp. 679-680, Allyn and Bacon, Inc., Boston, MA.
Office Action dated Mar. 23, 2011 issued in Chinese Patent Application No. 200880015451.5.
Australian Patent Examination Report date mailed May 5, 2015; Australian Patent Application No. 2013227982.
Indian Patent Examination Report date mailed Feb. 2, 2015; Indian Patent Application No. 3502/KOLNP/2009.
European Search Report date mailed Nov. 26, 2014, European Patent Application No. 08727203.5.

*Primary Examiner* — Michael Pepitone
(74) *Attorney, Agent, or Firm* — McGuireWoods LLP

(57) ABSTRACT

Embodiments relate to a relatively rapid transesterification process including transesterifying condensation polymers such as polyethylene terephthalate (PET), or other polyesters used in commerce, with a modifying monomer mix containing other monomers to manufacture new polymers containing the pre-condensed moieties. The process preferably only involves transesterification as a reaction mechanism. The process preferably produces a rapid buildup of molecular weight and/or polymer uniformity by the high temperature transesterification of the condensation polymer with the modifying monomer mixture. The process can be performed in any suitable vessel including an extrusion line, and it has the advantage of greatly reduced cycle times over currently used condensation polymer utilization processes such as the recycling of PET into other materials.

18 Claims, No Drawings

(56) References Cited

U.S. PATENT DOCUMENTS

| | | |
|---|---|---|
| 6,414,063 B1 | 7/2002 | Bassam et al. |
| 6,428,900 B1 | 8/2002 | Wang |
| 6,429,233 B1 | 8/2002 | Oguri et al. |
| 6,454,982 B1 | 9/2002 | Branum |
| 6,472,557 B1 | 10/2002 | Pell, Jr. et al. |
| 6,512,046 B2 | 1/2003 | Ueno et al. |
| 6,534,624 B2 | 3/2003 | Ito et al. |
| 6,555,623 B1 | 4/2003 | Yang et al. |
| 6,573,304 B1 | 6/2003 | Durand et al. |
| 6,583,217 B1 | 6/2003 | Li et al. |
| 6,586,558 B2 | 7/2003 | Schmidt et al. |
| 6,592,218 B1 | 7/2003 | Salsman |
| 7,157,139 B2 | 1/2007 | Salsman et al. |
| 8,476,364 B2 * | 7/2013 | Salsman ........................ 524/599 |
| 2002/0061933 A1 | 5/2002 | Kawamura et al. |
| 2005/0004261 A1 | 1/2005 | Yatake |
| 2005/0234213 A1 * | 10/2005 | Salsman et al. ............... 528/272 |
| 2006/0281851 A1 | 12/2006 | Salsman |
| 2008/0196813 A1 | 8/2008 | Doney et al. |
| 2008/0236443 A1 | 10/2008 | Salsman |
| 2009/0022936 A1 | 1/2009 | McGill |
| 2009/0087612 A1 | 4/2009 | Salsman |

FOREIGN PATENT DOCUMENTS

| | | |
|---|---|---|
| GB | 1317278 A | 5/1973 |
| JP | 08-253596 A | 10/1996 |
| JP | 11-349672 A | 12/1999 |
| JP | 2002-003815 A | 1/2001 |
| JP | 2004-083695 A | 3/2004 |
| WO | 00/58383 A1 | 10/2000 |
| WO | WO 2004/069896 A1 | 8/2004 |

* cited by examiner

POLYMER MANUFACTURING PROCESS

CROSS-REFERENCE TO RELATED APPLICATIONS

This application is a continuation of U.S. patent application Ser. No. 11/693,185, filed Mar. 29, 2007, now U.S. Pat. No. 8,476,364, which is incorporated herein by reference in its entirety.

BACKGROUND

1. Field of the Invention

Embodiments relate generally to a transesterification process involving at least the transesterification of polyester terephthalate (PET) or other polyesters used in commerce, with a modifying monomer mixture to produce new polymers. The new polymers so produced are useful, for example, as adhesives in the manufacture of a variety of carpet products and other textiles, or for other adhesive uses.

2. Description of Related Art

Esterification typically includes the condensation of organic carboxylic acids and alcohols to yield ester linkages. Polyesters are made when multifunctional carboxylic acids are reacted with multifunctional alcohols to yield polymers containing repeating ester units. Polyesters have become important polymer components used in a variety of industries.

The esterification reaction required to manufacture polyester polymers usually takes a great deal of time compared to other polymerization reactions. For example, a typical aromatic polyester of moderate molecular weight can require between 12 and 24 hours to finish whereas an aromatic styrene polymer prepared by free radical polymerization can take as little as one hour to complete. There are several reasons for this increased duration. One reason is that the temperatures required for esterification are much higher on the order of 200 to 250 degrees Centigrade than those of other reactions such as free radical polymerization which require temperatures of only 70 to 100 degrees Centigrade. Another reason more time is needed is when higher molecular weight polyesters (such as those greater than 10,000 average number mw) are the goal. With higher molecular weight polyesters, the reaction becomes longer when the equivalents of hydroxyl and acid components are closer to being equal.

While initially the reaction proceeds rapidly, once reaction temperatures have been reached the reaction starts slowing down as the free acids and hydroxyl groups become less concentrated in the mix. As the reaction slows additional steps and techniques are used to continue the reaction and create larger and larger molecular weights. With very large molecular weights (those greater than 30,000 mw) most often the material is transferred from the original vessel to one where more surface area, heat and/or agitation can be applied. Even larger molecular weights can be obtained by using additional processing steps such as solid state reactions or transesterification.

The following is an excerpt from Organic Chemistry by Morrison and Boyd, pages 679-680, second edition: "In the esterification of an acid, an alcohol acts as a nucleophilic reagent; in hydrolysis of an ester, an alcohol is displaced by a nucleophilic reagent. Knowing this, we are not surprised to find that one alcohol is capable of displacing another alcohol from an ester. This alcoholysis (cleavage by an alcohol) of an ester in called transesterification." "Transesterification is an equilibrium reaction. To shift the equilibrium to the right, it is necessary to use a large excess of the alcohol whose ester we wish to make, or else to remove one of the products from the reaction mixture. The second approach is the better one when feasible, since in this way the reaction can be driven to completion."

When making condensation polyesters, transesterification can be used as an additional processing step to achieve higher molecular weights with already condensed polymers or monomers. At higher temperatures the elimination of an alcohol and subsequent removal of it by vacuum will greatly increase molecular weight. At some point the end group can be liberated and removed by heat and/or vacuum thus building molecular weight. To extend the molecular weight of preformed polymers, transesterification sometimes follows an initial esterification step where the monomer mix, usually containing excess glycols, is first reacted to a point where most of the free carboxylic groups are used up. Or transesterification can be used alone to create polymers where the carboxylic groups have been pre-formed into esters with an easily volatilized alcohol, most commonly methanol. Thus both esterification and transesterification can be used separately or together in the process of making polyesters.

Over the years, many processes have been developed for manufacturing polyesters. In the 1940's it was discovered that polyester polymers could be made having very desirable properties such as clarity and high impact strength through the condensation of aromatic dicarboxylic acids with glycols using high temperatures and long reaction times to achieve higher molecular weights. By far the most important synthetic polyester today is polyethylene terephthalate (PET). This polymer is one where the multifunctional carboxylic acid is a terephthalate or terephthalic acid and the multifunctional alcohol is ethylene glycol. PET is a crystalline polymer that can be used for a variety of items such as film textile, fiber, beverage bottles, and other types of containers.

One method of making PET is to start with dimethyl terephthalate and transesterify with ethylene glycol liberating methanol. As methanol is removed from the process the molecular weight is driven up. Several transesterification catalysts have been used for this method. Due to the environmental problems associated with methanol, it has become more common to use terephthalic acid and ethylene glycol with a suitable esterification catalyst. Again there are a number of such catalysts used.

Esterification of terephthalic acid requires high temperatures, in excess of 200° C., and long reaction times, sometimes longer than 24 hours. Thus it becomes a very energy intensive polymer to make. When very high molecular weights are needed, 50,000 or greater (which is considered low compared to other polymers), solid state reactors are used to vacuum as much glycol off as possible thus extending the chain length through transesterification and the removal of glycol. Additional heat and time are needed.

The PET manufacturing segment of the polymer industry has become so large that the cost of the raw materials of the PET polymer is low in comparison to other similar performance polymers. Large PET processing lines dedicated entirely to the manufacture of the PET polymers produce PET polymer on a continuous basis. Due to this production there has been a great deal of controversy over the large amounts of PET that are being recovered from post consumer waste streams. Due to this abundance of post consumer waste, there have been a large number of patents issued that concern the utilization of this PET waste. As we progress in the manufacturing techniques for other monomers and the need for higher performance materials become greater we will naturally expect to see the utilization of other condensation polymers to the point where they become prevalent in the waste streams.

This has already started to happen with PET containing other barrier materials and with PEN or polyethylene napthalate.

As the waste stream from recycling started producing waste PET in abundance there were several patents written to utilize this potential raw material source. These patents became a technology in their own right. The first approaches to using PET were geared toward breaking down the ester linkages through hydrolysis with water or glycolysis. Glycolysis is a specific form of transesterification where excess glycol is used to degrade the molecular weight. In this way the individual components of the PET can be regenerated. In U.S. Pat. No. 4,078,143 issued to Malik, et al. entitled "Process for depolymerizing waste ethylene terephthalate polyester", a process is described where PET is broken down by glycolysis to bis-(2-hydroxy ethyl)terephthalate, a monomer that can be utilized to reform the PET. In U.S. Pat. No. 4,163,860, issued to Delatte, et al. entitled "Process for obtaining dimethyl terephthalate from polyester scrap" methanol is used to transesterify scrap PET back to dimethyl terephthalate that is purified for use in the PET manufacturing process. In U.S. Pat. No. 4,355,175, issued to Pasztaszeri entitled "Method for recovery to terephthalic acid from polyester scrap", a method of hydrolyzing the PET and purifying and recovering the terephthalic acid is described. In U.S. Pat. No. 4,578,502 issued to Cudmore entitled "Polyethylene terephthalate saponification process", a process is described wherein PET is broken down into its monomeric constituents through saponification with alkali. In U.S. Pat. No. 4,929,749 issued to Gupta, et al. entitled "Production of terephthalate esters by degradative transesterification of scrap or virgin terephthalate polyesters", higher boiling alcohols are used to transesterify the PET into lower molecular weight materials for use as raw materials for the manufacture of other polymers. In U.S. Pat. No. 5,101,064 issued to Dupont, et al. entitled "Production of terephthalate esters by degradative transesterification of scrap or virgin terephthalate polyesters", a process is described where groups having 6 to 20 carbons are used to degrade the PET, distill off the glycol byproduct, and recover the diester.

In U.S. Pat. No. 5,266,601 issued to Kyber, et al. entitled "Process for preparing polybutylene terephthalate from PET scrap" a method of using PET by glycolysis and ester exchange with 1,4 butanediol and subsequent polycondensation is described. In U.S. Pat. No. 5,319,128 issued to Dupont, et al. entitled "Production of terephthalate esters by degradative transesterification of scrap or virgin terephthalate polyesters" a method of tranesterifying PET using higher molecular weight alcohols with 6 to 20 carbons and then recovering the diesters of terephthalate is described. In U.S. Pat. Nos. 6,031,128 and 6,075,163 issued to Roh, et al. entitled "Process for manufacturing terephthalic acid", a process is described for manufacturing terephthalic acid from waste PET whereby PET is hydrolyzed to disodium terephthalate and then acid neutralized to recover the free terephthalic acid. In U.S. Pat. No. 6,472,557 issued to Pell, Jr. et al. entitled "Process for recycling polyesters", a process for depolymerizing PET to dimethylterephthalate and then hydrolyzing it to terephthalic acid for reuse is described. Although all of these processes work, they are all very energy intensive ways of recycling the PET and do not utilize the time and energy that has already gone into making the PET polyester. More often these processes end up costing as much or even more than the cost of the monomers they are trying to reclaim. This is in large part due to the low cost of the beginning PET feed stocks and the refined methods for converting to the starting monomers. Also the additional energy required to reclaim the monomers from recycled PET adds substantially to the cost.

In the techniques used below, it is not necessary to take the PET polymer all the way to its monomeric constituents and thus at least part of the time and energy of conversion of the terephthalic acid and ethylene glycol is conserved. However in all cases the transesterification conversion is done to break down the PET linkages and lower the molecular weight to much lower oligomeric forms prior to subsequent reactions.

There also are a number of methods for the utilization of PET as a raw material for the manufacture of other polymers where terephthalic acid and/or ethylene glycol can be integrated as one of the components. One such area is in the use of PET to make polyols that in turn are used for making urethane foams. In U.S. Pat. No. 4,439,549 issued to Brennan entitled "Novel aromatic polyester polyol mixtures made from polyethylene terephthalate residues and alkylene oxides" a method of reacting PET with glycol to degrade to an oligomeric polyol and then subsequent reaction of the polyol with an isocyanate moiety to produce rigid foam is described. In U.S. Pat. No. 4,469,824 issued to Gigsby, Jr., et al. entitled "Liquid terephthalic ester polyols and polyisocyanate foams therefrom", PET is digested with diethylene glycol and other glycols with some of the ethylene glycol and then removed to form a polyol that reacts with an isocyanate to form a polyisocyanate foam. In U.S. Pat. No. 4,485,196 issued to Speranza entitled "Liquid phase polyols which are alkylene oxide adducts of terephthalic esters" a technique of making polyols for further processing into urethane foams is described. The polyol is further reacted by ethoxylation or propoxylation to liquefy and inhibit crystallinity. It is then useful for further conversion into polyurethanes. In U.S. Pat. No. 5,948,828 issued to Reck entitled "Technology development and consultancy" reclaimed PET is digested with diethylene glycol, insolubles are removed, and ethylene glycol and free diethylene glycol are removed to achieve a final hydroxyl value for a polyol. In U.S. Pat. No. 6,573,304 issued to Durant, et al. in June of 2003 entitled "Method for obtaining polyols and polyol thus obtained" a process for transesterification with glycols and subsequent removal of free glycols stopping at a narrow molecular weight is described. These methods utilize excess glycol and transesterification to shift the equilibrium back to lower molecular weight entities that can be further processed.

Some techniques developed utilizing PET have at least partially preserved some of the ester moieties and therefore some of the time and energy already used in making the PET. In U.S. Pat. No. 4,977,191 issued to Salsman entitled "Water-soluble or water dispersible polyester sizing compositions", a process is described where other polymers are made by first degrading the PET into oligomers containing the terephthalate moiety and second building back up the molecular weight using other aromatic or aliphatic acids. In U.S. Pat. No. 5,726,277 issued to Salsman entitled "Adhesive compositions from phthalate polymers and the preparation thereof" adhesive compositions are described that are made from PET that is digested or transesterified with glycols and oxyalkylated polyols, either ethoxylated or propoxylated. A similar type of reaction is used in U.S. Pat. No. 5,958,601 issued to Salsman entitled "Water dispersible/redispersible hydrophobic polyesters resins and their application in coatings". In this patent however an ester of a fatty acid and alcohol containing free hydroxyl groups is used in combination with glycols to degrade the PET polymer to lower molecular weight species before a molecular weight buildup is done with additional aromatic acids.

There are additional polymer applications where PET has been used as a raw material as well. In U.S. Pat. No. 5,820,982 issued to Salsman entitled "Sulfoaryl modified water-soluble or water-dispersible resins from polyethylene terephthalate or terephthalates" compositions are described which contain the terephthalate moieties along with sulfonated aromatic groups. Such resins are useful for adhesives, ink resins, dye leveling on polyester and nylon fibers, etc. The process for preparation of these compositions requires a PET glycolysis step followed by additional acids and a molecular weight buildup esterification step. The processing times can be 12 to 24 hours. In U.S. Pat. No. 6,133,329 issued to Shieh, et al. entitled "Thermoplastic polyester resin composition" a composition is described where PET is first digested with a glycol mixture for 3 hours at high temperatures and then reacted with a natural oil for making it compatible with hydrocarbon and hydrofluorocarbon blowing agents. In U.S. Pat. No. 6,512, 046 issued to Ueno, et al. entitled "Polymerizable unsaturated polyester resin composition" several compositions are described where PET is first depolymerized to achieve a polyester skeleton, then built back up with a dibasic acid, and further reacted with an unsaturated monomer. In U.S. Pat. No. 6,534,624 issued to Ito, et al. entitled "Process for producing alkyd resins" a process is described where polyester is depolymerized and then esterified in a mixture of alcohols, glycols, fatty acids, etc. It is noted in this patent that the use of terephthalic acid has not been in practice in the past with alkyd technology because this component is more costly than phthalic or phthalic anhydride. Again all of these patents, some very recent, describe first a depolymerization step and then an esterification step to build back up molecular weight to make polymers suitable for other areas of use.

Other techniques deal with the use of reclaimed PET by cleaning up the PET from other wastes and using it as a co-blend prior to or in an extruder with virgin PET or other polymers that can be coextruded with the PET. Once reheated PET loses intrinsic viscosity (I.V.). Intrinsic viscosity has become a much easier method of comparing molecular weights of PET than other more time consuming methods. Once processed, the intrinsic viscosity drops and its use as a feedstock for the original article made becomes limited. In U.S. Pat. No. 5,225,130 issued to Deiringer entitled "Process for reclaiming thermally strained polyester scrap material" mixed streams of recycled PET are cleaned and post condensed with virgin PET. In U.S. Pat. No. 5,503,790 issued to Clements entitled "Method of producing disposable articles utilizing regrind polyethylene terephthalate" recycled PET is used to create articles that are less demanding of higher intrinsic viscosity. In U.S. Pat. No. 5,554,657 issued to Brownscombe, et al. entitled "Process for recycling mixed polymer containing polyethylene terephthalate" a process for recovering PET that involves dissolving the PET from a recycled stream, removing the solvents, and rinsing the PET is described. In U.S. Pat. No. 6,399,695 issued to Moriwaki, et al. entitled "Thermoplastic polyester resin composition" PET is melted with a polyolefin or glycidyl methacrylate to produce a composite material. In U.S. Pat. No. 6,583,217 issued to Li, et al. entitled "Composite material composed of fly ash and waste polyethylene terephthalate" the PET is mixed with the entitled materials and extruded. In the above references no reaction of the PET takes place even though there are subsequent reprocessing steps. There are many other references where recycled PET is cleaned and used as part of the mixture back into articles such bottles, film, etc. Limitations due to the lower intrinsic viscosity of the recycled PET reduce the amount used in critical applications to 5% or less.

There are also current practices where PET is modified by transesterifying with polyethers. These can be glycols or alcohols that have been ethoxylated or propoxylated. These polymers contain the block segments of PET with block segments of the polyethers and thus usually exhibit properties of both. In U.S. Pat. No. 4,785,060 issued to Nagler entitled "Soil release promoting PET-POET copolymer, method of producing same and use thereof in detergent composition having soil release promoting property" PET and a polyoxyethylene polymer are reacted together in a reactor such that an equilibrium is reached. This reaction is based on transesterification of the hydroxyl end groups of the polyether with the ester linkages contained in the PET. In U.S. Pat. No. 6,454, 982 issued to Branum entitled "Method of preparing polyethylene modified polyester filaments" a method is described wherein polyethylene glycol is reacted into PET under transesterification conditions and solid stated to a higher intrinsic viscosity.

In the referenced documents, glycols, polyethers, or simple glycol monoesters are used to degrade or lower the molecular weight of the PET in order to get to monomeric or oligomeric forms of terephthalic acid that can be further utilized as a polyol source for urethanes, to use as adhesive components with glycidyl ethers to form epoxies, or as coatings and/or adhesives.

Another polymer of commerce is polyethylene naphthalate PEN. Within the last few years there has been much activity regarding the use of PET with PEN polymers. This is due in part to better properties such as clarity, strength, and increased crystallinity that translates to better barrier properties obtained with PEN. However, PEN is much more expensive than PET. Therefore, several processes for making copolymers of the two have been developed. In U.S. Pat. No. 5,902,539 issued to Schmidt, et al. entitled "Process for making PEN/PET blends and transparent articles therefrom" a process is described where ethylene glycol is used to reduce the intrinsic viscosity and increase the range of use for PET and PEN copolymers.

The following is an excerpt from U.S. Pat. No. 6,414,063, issued to Bassam, et al. entitled "Nucleated pet/pen polyester compositions." "It is known that medium content PET/PEN compositions (compositions with PET:PEN ratios around 50:50) are amorphous in nature. The range of compositions which display this amorphous behaviour is generally accepted to be around PET:PEN=20:80 to PET:PEN=80:20, as described by two PEN manufacturers—Shell (see FIG. 1 of presentation to "BevPak" conference, Spring 1995, U.S.A) and Hoechst-Trevira (page 4 of Polyclear® N technical literature). The disadvantage of this behaviour is that the use temperature of compositions in the 80/20 to 20/80 region is substantially reduced. The use temperature is dependent on the glass transition temperature (Tg) in this region. In contrast, the use temperature of PET/PEN compositions with <20% PET or <20% PEN is dependent on the crystalline melt temperature (Tm). Tm is over 100° C. higher than the Tg for PET/PEN compositions; hence resulting in the substantial reduction in use temperature observed in the 20/80 to 80/20 composition region. The same observations on the amorphous/crystalline nature of PET/PEN compositions were also made by Lu and Windle (see FIG. 2 in Polymer 36 (1995), pages 451 459) and Andresen and Zachmann (Colloid & Polymer Science 272 (1994), page 1352). Andresen and Zachmann also found that blends of PET and PEN formed a single phase within 2 minutes of melting. This is usually good evidence for rapid formation of a PET/PEN copolyester by transesterification. Thus the behaviour of PET/PEN blends and copolymers can be expected to be the same with regards to crystallisation during all melt processing operations. In the case of bottle manufacture using PET/PEN copolymers and blends, U.S. Pat. No. 5,628,957 (to Continental PET Technologies Inc.) states that mid-range PET/PEN compositions containing 20 to 80% PEN are substantially amorphous and describes the use of an additional strain-hardenable (i.e. crystallisable) layer for these mid-range PET/PEN bottles."

It is especially interesting to note from this patent that the blends formed a single phase within 2 minutes of melting. Presumably from this and information presented in the description one can surmise that ester compatibility increases the rate of transesterification. Also, it can be inferred that PET and PEN copolymer combinations have been made via melting and/or processing since combinations of the two polymers were started. Again transesterification of the two is the chemistry that makes this happen. In U.S. Pat. No. 6,586,558 issued to Schmidt, et al. entitled "Process for making PEN/PET blends and transparent articles therefrom" glycols are used to lower the intrinsic viscosity and allow more processable viscosities for blends of these two polymers. Again transesterification allows this to occur.

While there has been a lot of activity directed toward utilizing PET as a raw material to manufacture other polymers or as a composite material, PET is not being utilized in these polymers as a raw material. The problems that exist with these prior techniques include raw material contamination, difficulty of reaction, and incompatibility with one or more of the other reactive groups. For instance, in U.S. Pat. No. 5,250,333 issued to McNeely, et al. entitled "Modified polyethylene terephthalate" there is described compositions where other alkoxylated polyols and dicarboxylic acids are used in combination with terephthalic acid and ethylene glycol to produce a less crystalline form of PET. Indeed there are many applications that use terephthalate moieties but require less crystallinity than that of PET. For instance, there are many film applications that require less crystallinity for more elastomeric properties. The polyols mentioned in the previous paragraphs are another example. In U.S. Pat. No. 6,428,900 issued to Wang entitled "Sulfonated copolyester based water dispersible hot melt adhesive" a polyester which contains water dispersible sulfonated branched copolyester polymers is described. These copolyester polymers use difunctional carboxylic acids like terephthalic acid in their makeup. Crystallinity would inhibit water redispersibility which is an important aspect of the disclosure. In U.S. Pat. No. 6,555,623 issued to Yang, et al. entitled "Preparation of unsaturated polyesters" a process is described where MPD (methyl propanediol) is used along with aromatic diacids such as terephthalic acid and maleic anhydride to produce unsaturated polyesters suitable for further reaction through the unsaturated group. Again polymer crystallinity is to be avoided.

There are a number of polymers that currently utilize phthalic anhydride as a preferred difunctional aromatic acid. One reason for this is that for practical considerations one of the acid groups has already been reacted and is an anhydride. This lowers the weight percent needed in the subsequent polymers being made. In addition phthalic anhydride esterifies at lower temperatures than terephthalic acid. Using terephthalic acid as an alternate would not be as economical to begin with. But terephthalic acid could be used if the right process to use recycled PET were available that would eliminate this economical difference.

There are a number of polymers containing ester linkages and the number and scope of polymers that utilize or could utilize the raw materials that make up PET or other condensation polymers of commerce are too numerous to list within the scope of this write. The following broad based articles of commerce all use or have used terephthalic acid (or aromatic acids like phthalic acid or anhydride) and/or ethylene glycol in their monomer makeup:

(1) Adhesives: either hot melt, water borne, or reactive;
(2) Ink resins: both as the binding agent and the carrier vehicle;
(3) Unsaturated resins: alone or in combinations with reactive diluents such as acrylics or styrene for composite mixtures with fiberglass, carbon fiber, etc.;
(4) Alkyd resins: both long and short alkyds for coatings and paint applications;
(5) Urethanes: As the polyol portion together with isocyanates to form adhesives, structural resins, or foams;
(6) Films: Less crystalline films for shrink wrap, laminating, etc.; and
(7) Polyols for powder coatings or fusable coatings.

As described above, PET (either virgin or recycled) is recognized as a material that can be used to make more PET, PET composites, or other polymers that contain terephthalate groups. The processes that have been used to make these materials contain within their steps glycolysis (or hydrolysis) of the ester linkages to create the beginning monomers such as terephthalic acid, or a much lower molecular weight terephthalate oligomer that can be reacted to generate more PET or other polymers through esterification. In no circumstance has there been activity that indicates advantage taken of the high molecular weight of PET (polyester polymers) being used to build higher molecular weight, on the order of 10,000 to 20,000, through transesterification with a lower molecular weight polyester.

In U.S. Pat. No. 7,157,139 issued to Salsman (January 2007) the issue of preservation of the high molecular weight of PET is addressed. The high molecular weight in PET is used to build the molecular weight of a lower molecular weight modifying polymer. The process described therein preferably involves two-steps that can be used to take full advantage of the high molecular weight of a precondensed polymer, like PET, to produce a new high molecular weight polymer. The first step, which involves no polymer of commerce, takes all the other monomers that are to be contained within the finished polymer, and reacts them first through esterification to form a modifying polymer containing terminal hydroxyl groups. In the second step, a commercially available condensation polymer such as PET is transesterified with the modifying polymer using heat and agitation to form the finished polymer.

The description herein of certain advantages and disadvantages of various features, embodiments, methods, and apparatus disclosed in other publications is not intended to limit the scope of the present embodiments. Indeed, the preferred embodiments may include some or all of the features, embodiments, methods, and apparatus described above without suffering from the same disadvantages.

SUMMARY OF THE EMBODIMENTS

It is a feature of an embodiment to provide a process for manufacturing a polyester polymer. Still another feature is to provide a process for manufacturing a polyester polymer from PET or other commercially available condensation polymers.

An additional feature of the embodiments is to provide a process for modifying PET or other commercially available condensation polymers. Yet another feature is to provide a process for modifying PET or other commercially available condensation polymers without degradation to form high molecular weight cross-linked polymers.

It is an additional feature of the embodiments to provide a process for modifying PET or other commercially available condensation polymers by utilizing a plurality of appropriate monomers. Still an additional feature is to provide a process for modifying PET or other commercially available condensation polymers by transesterifying the appropriate monomer mix with the PET or other commercially available condensation polymers.

In accordance with these and other related features, the embodiments provide a process for manufacturing a polyester polymer from PET or other commercially available condensation polymers. The process involves selecting a beginning monomer mix from a plurality of appropriate monomers and transesterifying with the PET or other commercially available condensation polymers to form a useful new polymer. No polyesterification is used in the process.

DETAILED DESCRIPTION OF THE PREFERRED EMBODIMENTS

The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a carpet backing" includes a plurality of such carpet backings, as well as a single carpet backing, and a reference to "an adhesive composition" is a reference to one or more adhesive compositions and equivalents thereof known to those skilled in the art, and so forth.

Unless defined otherwise, all technical and scientific terms used herein have the same meanings as commonly understood by one of ordinary skill in the art to which this invention pertains. Although any methods and materials similar or equivalent to those described herein can be used in the practice or testing of the present invention, the preferred methods, devices, and materials are now described. All publications mentioned herein are cited for the purpose of describing and disclosing the various materials, compositions, and carpet manufacturing methods that are reported in the publications and that might be used in connection with the invention. Nothing herein is to be construed as an admission that the embodiments described herein are not entitled to antedate such disclosures by virtue of prior invention.

Monomers in the process disclosed herein typically are molecules that have molecular weights lower than 1,500 and contain one, two, or more than two reactive hydroxyl or ester groups that can transesterify with esters. The phrase "modifying monomer mix" as it is used herein, includes a monomer or mixtures of monomers used to modify through transesterification a PET, PEN, or other high molecular weight polyester of commerce (herein referred to as PET), to achieve a new polymer with new desired properties.

The process described herein preferably entails a one step reaction used to build up a new polymer using PET or other high molecular weight polyesters. The one step can be accomplished in stages of PET adds to a modifying monomer mix that has characteristics that both dissolve and transesterify the PET. Transesterification is a reaction that takes place when an OH or alcohol group becomes a nucleophile and exchanges take place at an ester linkage. A polymer preferably is made containing these groups as a combination of end groups and esterified linkages. While not intending on being bound by any theory of operation, the inventor believes that as PET is added, molecular weight builds as the monomers break into the PET and become oligomer chains containing functional groups. Subsequent PET is not only believed to be dissolved faster by an oligomer that now possesses terephthalate moieties, but produces larger and larger molecular weight chains as more and more PET is added. Transesterification continuously occurs above the polymer's Tg (glass transition temperature) and the alcohol generated from the nucleophile displacement itself becomes a nucleophile that can further react. In this way the reaction may continue until at some point equilibrium is reached where no further change in the polymer mixture occurs as the number of new end groups formed is in equilibrium with the amount and type of new ester linkages formed and the mixture becomes a homogeneous new polymer. If the modifying monomer mix contains large segments in between reactive end groups, then the homogeneous new polymer can take on characteristics more like the large segments. If the mixture contains segments with end groups that participate more or less equally in the transesterification process, then the new polymer becomes a homogeneous polymer with new properties relative to the starting materials.

One of the parameters the inventor believes important to control in polymer synthesis is molecular weight. In the process disclosed herein, it is believed that multi-functional monomers containing more than two reactive groups in the modifying monomer mix introduce sites that provide cross-link density. Cross-link density can be important in maintaining molecular weight properties. The final molecular weight may be controlled by the amount of monomers containing more than two reactive groups in the modifying monomer mix and the percentage of that modifying monomer mix reacted with the PET. For instance, if PET is used in quantities above 60 percent, a lower amount of multifunctional monomers containing more than two reactive groups are needed in the modifying monomer mix as PET supplies the linear molecular weight needed to make a polymer of sufficient molecular weight. Sufficient molecular weight depends upon the final properties desired and is usually high enough to achieve some tenacity and or film strength. Further processing of the new polymer, however, may be desirable.

With the manufacture of polyesters through condensation alone the molecular build up is rapid initially and slows down considerably as the molecular weight increases. The process described herein differs substantially from other processes that utilize PET in that no esterification reaction is needed. The polymer process is based completely on transesterification. This not only opens up the use of a much broader range of reaction vessels, but also greatly reduces process times since in polymer synthesis transesterification is a much faster reaction than polyesterification.

The process described in the embodiments eliminates many of the problems associated with the known processes described earlier. Known processes digest PET to reconstitute the original starting materials, which in many cases is more expensive than the cost of manufacturing the starting materials. Once digested, the materials have to be re-condensed, which is inherently energy inefficient and produces toxic levels of glycol and dioxane in the waste stream. Thus, only small amounts of PET are reprocessed in this manner. In contrast, the process of the embodiments eliminates these problems since it preserves the ester linkages already formed in the commercially available condensation polymer so that re-condensation of monomers or oligomers is unnecessary. In this regard, it becomes easier to consider transesterification as the molecular weight building step for the lower molecular weight modifying monomer mix. As PET is added, molecular weight builds, and depending on the amount of monomers containing more than two reactive groups, cross link density increases. The reaction mass changes from monomeric, to oligomeric, and then to polymeric as more PET is added and the reaction proceeds.

The process of the embodiments preferably involves the rapid transesterification of a PET polymer with a modifying monomer mix. Careful monitoring of temperatures and reaction rates are not necessary with the only requirement being enough heat to transesterify the mixture to an equilibrium state. Reaction rates are dependent on several factors including (1) time, (2) temperature, (3) modifying monomer mix, (4) hydrophilicity of modifying monomer mix, (5) number and type of hydroxyl functionality contained in the modifying monomer mix, and (6) transesterification catalyst. Of these factors, higher temperatures are believed to have the most effect on the time required to complete the reaction. For example, depending upon the catalyst, good transesterification of terephthalates starts around 200° C., greatly accelerates around 240° C., and is very rapid around 260 d° C. Reaction time at 200° C. is about ten hours to transesterify PET with a glycol like diethylene glycol. Reaction rate is reduced to about one hour at 240° C. and only fifteen minutes at 260° C. Heating is not as significant an issue since water is not being produced to hinder the increase in temperature. With more hydrophobic modifying monomers and modifying monomers with secondary hydroxyl groups or esters, these reaction times would be longer since the solubility of the PET is lower. Those skilled in the art will appreciate that the choice of the beginning modifying monomer mix may reduce reaction time, because selecting those monomers that provide more rapid breakdown may be useful to offset these longer reaction times.

In some instances, the process of the embodiments does not require the condensers or condensation receivers that are required in typical esterification vessels, and consequently, less expensive equipment can be used. In fact it is possible to complete the reaction in an extruder set up for the needed dwell times and mixing required. If no condensate is removed, no venting or condensers are required. The final desired polymer can be synthesized without further esterification, a major time consuming step in high molecular weight polyester synthesis. The embodiments disclosed herein therefore provide advantages such as lower reaction times, lower waste streams, higher utilization of PET, and higher finished molecular weights with less energy and time.

When utilizing the process described in the preferred embodiments, it may be advantageous to eliminate some of the lower molecular weight glycols produced in equilibrium in the reaction. For example, in the case of PET, it may be advantageous to remove some ethylene glycol as it is formed. In this way the properties imparted by the modifying monomer mix can be amplified. Removal of some ethylene glycol also may shift the equilibrium to a higher molecular weight so less monomers containing more than two reactive groups are needed for molecular weight gain through cross link density. This allows for the production of more linear polymers. If a monomer is used that has ester end groups such as a methyl ester, then methanol is produced in the reaction and can be removed to extend molecular weight.

The staged addition of the PET or condensation polymer may become more relevant as the total level used in making new polymers is increased above about 40 percent. At this point, it may become difficult to maintain the PET in a suspended state in a reactor, and problems can arise as the PET reaches its melting point and is more compatible with itself than with the modifying monomer mix. If the PET is added in stages of increasing amounts to the modifying monomer mix, it is possible to produce new polymers that contain more than 90 percent of the PET.

Staging the addition of the condensation polymer and allowing some equilibrium to be reached at each stage may reduce problems in an agitated reactor. The problems are much less pronounced if the process is performed within an extruder. However, other problems such as incompatibility between the PET and the modifying monomer mix can make extruder reactions more difficult, when compared to an agitated reactor.

The process described herein enables production of a a polymer in two parts. First, a polymer can be made in a reactor using PET to build properties such as molecular weight. Then, additional PET can be added in an extruder to create an even higher molecular weight polymer with properties that only very high molecular weight polyester polymers can achieve.

One of the purposes for staging the addition of PET is in allowing each addition to react in before additional material is added. A secondary purpose is to allow the temperatures to come back to a level where rapid transesterification can occur. One can readily see that with the proper equipment, the PET staging could be part of a continuous feed system that maintains the reaction conditions at optimum temperatures and optimum amount of fresh PET, until the entire amount of PET needed has been added.

This process can be used for generating polymers for a variety of applications. Lower molecular weight polymers, with subsequently lower melting points, provide excellent adhesives. Hydroxyl-terminated resins prepared in accordance with the embodiments described herein can be used as polyols for further reaction with epoxies or isocyanates in urethane production. Slightly higher molecular weight polymers prepared in accordance with the embodiments can be used as coatings such as hot melt coatings or powder coatings. Higher molecular weight polymers prepared in accordance with the embodiments also can be used as fibers. Further uses could involve augmentation of current film or fiber forming resins. Further processing of the polymers prepared in accordance with the embodiments with anhydrides could yield acid-terminated polymers for neutralization with bases and modified water dispersibility.

The preferred embodiments described herein relate to a method of making a polymer using a commercially available condensation polyester as a raw material that includes selecting a modifying monomer mix, and transesterifying the modifying monomer mix with the commercially available condensation polyester at a quantity predetermined by an end use application, to produce a final polymer. In accordance with the process, the modifying monomer mix includes at least one monomer, the at least one monomer preferably being a molecule including a hydroxyl or an ester, that is capable of participating in transesterification reactions, and that has a molecular weight of less than 1500. The modifying monomer mix preferably does not include components derived from the commercially available condensation polyester.

Suitable commercially available condensation polyesters useful as a raw material in the processes described herein include those capable of transesterification with the modifying monomer mixture. Preferably, the commercially available condensation polyesters are those selected from PET, PBT, PEN, PTT (polytrimethylene terephthalate), and most preferably, these condensation polymers are recycled from existing materials containing these materials. The commercially available condensation polyesters typically are used in an amount ranging from about 30 to about 96 weight percent, based on the total weight of the polymer produced, and preferably from about 60 to about 80 weight percent. Skilled artisans are capable of selecting a suitable commercially available condensation polyester for use in the embodiments, using the guidelines provided herein.

The modifying monomer mix useful in the processes described herein preferably include those with pendant hydroxyl or ester groups, and preferably, although not necessarily, have a molecular weight of less than about 1500. The molecular weight can be calculated from the structure from the monomer, or is already known from manuals (e.g., trimethylol propane has a molecular weight of about 134). Preferably, the molecular weight of the monomer mix is less than about 1,300, and more preferably less than about 1,200, wherein the molecular weight is the total molecular weight of all of the monomers used in the mixture.

The monomer mix may include a single monomer, or a mixture of monomers. Suitable monomers include, but are not limited to alcohols, acids, polyethoxylates, ethoxylate condensates, esters, di-esters, tri-esters, and amines and amides with functional alcohol groups. Suitable alcohols include, but are not limited to butanol, hexanol, lauryl alcohol, decanol, glycerine, trimethylolpropane, neopentyl glycol, ethylene glycol, sorbitol, pentaerythritol, cyclohexane dimethanol, stearyl alcohol, and the like. Suitable acids include, but are not limited to adipic, lauric, palmitic, stearic, oleic, behenic, linolenic, succinic, maleic, maleic anhydride, butanoic, phthalic, phthalic anhydride, isophthalic, terephthalic, trimellitic anhydride, and the like. Suitable polyethoxylates include, but are not limited to diethylene glycol, triethylene glycol, polyethylene glycol 200, polyethylene glycol 400, polyethylene glycol 600, polyethylene glycol 800, polyethylene glycol 1000, and the like. Suitable ethoxylate condensates include, but are not limited to 1 to 25 moles of ethylene oxide on the alcohols or acids listed above. Suitable esters, di-esters, and tri-esters include, but are not limited to the acids and the (alcohols, polyethoxylates, or ethoxylate condensates) above such as butyl laurate, ethylene glycol distearate, cyclohexane dimethanol dioleate, etc. Suitable amines or amides with functional alcohol groups include, but are not limited to ethylene oxide condensates of amines. It is preferred in the embodiments that the monomers used to formulate the monomer mix are not the same monomers used to make the commercially available polyester with which it is reacted.

The amount of monomers used in the monomer mix typically will vary depending on the desired use of the resulting polymer. Those skilled in the art will be capable of determining the amount of monomer mix useful in the processes described, using the guidelines provided herein.

The time of reaction and temperature of reaction also may vary depending on the monomer mix and commercially available polyester. Preferably, the reaction takes place at a temperature within the range of from about 150 to about 350° C., preferably from about 200 to about 290° C., and for a period of from about 0.5 to about 10 minutes, preferably from about 1 to about 5 minutes. The embodiments now will be described with reference to the non-limiting examples.

EXAMPLES

The following examples, unless otherwise stated, were all prepared in a 250 milliliter flask fitted with a condenser, a funnel for the introduction of polymer adds, a thermometer, a variable speed agitator, a tube for the introduction of an inert gas, and a heating mantel with a scaled rheostat controller. The table in the examples represent the ingredients, percentage of each, amount in grams charged, and number and quantity of staged adds in grams. The PET (polyethylene terephthalate) used was repelletized PET obtained from the recycling of PET beverage bottles. The PEN (polyethylene naphthalate) was pelletized, virgin material.

Example 1

| Ingredients | Percent | Amount Charged | Staged Adds of PET |
|---|---|---|---|
| Bis-diethylene glycol adipate | 25.00 | 50.00 | |
| Tyzor TPT | 0.01 | 0.02 | |
| PET in pellet form, crystallized | 74.99 | 149.98 | 1-25 |
| | | | 2-15 |
| | | | 3-15 |
| | | | 4-20 |
| | | | 5-25 |
| | | | 6-25 |
| | | | 7-24.98 |
| Total | 100.00 | 200.00 | 149.98 |

The bis-diethylene glycol adipate and the Tyzor TPT were added to the flask and heated to 200° C. with agitation. The PET was then added in stages. After each add the temperature was brought to 250° C. with agitation and allowed to become fully homogeneous and clear before the next staged add. The final polymer was held at 250° C. for an additional 30 minutes before cooling. Total time for this reaction was 2 hours and 10 minutes. The polymer's properties improved with each add of PET. Although still somewhat tacky the polymer exhibited decreased crystallinity at room temperature. There was not enough room in the flask for more PET adds, but it was evident that higher molecular weights could be obtained with increasingly levels of PET.

Example 2

| Ingredients | Percent | Amount Charged | Staged Adds of PET |
|---|---|---|---|
| Bis-diethylene glycol adipate | 15.00 | 30.00 | |
| Tyzor TPT | 0.01 | 0.02 | |
| PET in pellet form, crystallized | 84.99 | 169.98 | 1-15 |
| | | | 2-15 |
| | | | 3-20 |
| | | | 4-20 |
| | | | 5-25 |
| | | | 6-25 |
| | | | 7-30 |
| | | | 8-19.98 |
| Total | 100.00 | 200.00 | 169.98 |

The bis-diethylene glycol adipate and the Tyzor TPT were added to the flask and heated to 200° C. with agitation. The PET was then added in stages. After each add the temperature was brought to 250° C. with agitation and allowed to become fully homogeneous and clear before the next staged add. The polymer was held an 30 minutes at 250° C. after all adds. Total time for this reaction was 2 hours and 30 minutes. The polymer produced had much higher strength properties relative to Example 1. PET having higher molecular weight is building up the new polymers molecular weight with increasing levels. This resin appeared to be a suitable candidate for a hot melt adhesive.

Example 3

| Ingredients | Percent | Amount Charged | Staged Adds of PET |
|---|---|---|---|
| Bis-diethylene glycol isophthlate | 25.20 | 50.40 | |
| Tyzor TPT | 0.01 | 0.02 | |
| PET in pellet form, crystallized | 74.79 | 149.58 | 1-15 |
| | | | 2-20 |
| | | | 3-20 |
| | | | 4-25 |
| | | | 5-25 |
| | | | 6-30 |
| | | | 7-14.58 |
| Total | 100.00 | 200.00 | 149.58 |

The bis-diethylene glycol isophthalate and the Tyzor TPT were added to the flask and heated to 200° C. with agitation. The PET was then added in stages. After each add the temperature was brought to 250° C. with agitation and allowed to become fully homogeneous and clear before the next staged add. The polymer was held an additional 30 minutes at 250° C. after the last PET add. Total time for this reaction was 2 hours and 40 minutes. The polymer produced had the appearance of a more non-crystalline PET polymer, with a clear appearance even after slowly cooling. At this level of linear monomer the strength properties were much more like a hot melt resin than PET. The Isophthalic moiety (a known decrystallizer for PET) was reacting in completely and was believed to assist in decrystallizing the highly crystalline PET chains.

Example 4

| Ingredients | Percent | Amount Charged | Staged Adds of PET |
|---|---|---|---|
| Bis-diethylene glycol isophthalate | 18.42 | 36.84 | |
| Ethoxylate Glycerine | 11.46 | 22.92 | |
| Tyzor TPT | 0.01 | 0.02 | |
| PET in pellet form, crystallized | 70.11 | 140.22 | 1-15 |
| | | | 2-15 |
| | | | 3-20 |
| | | | 3-20 |
| | | | 4-25 |
| | | | 5-25 |
| | | | 6-20.22 |
| Total | 100.00 | 200.00 | 140.22 |

The bis-diethylene glycol isophthalate, the ethoxylated glycerine, and the Tyzor TPT were added to the reaction vessel and heated to 200° C. Ethoxylated glycerine was used because glycerine alone did not produce satisfactory results using similar conditions, although glycerine alone may be satisfactory under other operating conditions. The PET was added in stages with each stage brought up and back up to 250 C. After all the PET was added the polymer was kept at 250° C. for an additional 30 minutes to insure equilibrium and homogeneity of the polymer. This reaction proceeded without problems. The polymer had an initial viscosity after finishing of 4 poise at 175° C. The polymer produced was not believed to be suitable for a coating polymer because the strength was too low, but the resulting polymer had properties that were suitable for other polymer applications.

Example 5

A vacuum of 20 In. Hg was exerted on the polymer of Example 4 for 12 minutes at 250° C. The viscosity went to 9 poise at 175° C. The viscosity of this polymer was 9 poises at 175° C. The strength was good and better than Example 4 but the polymer did not have adequate resilience for use as a coating polymer. The resulting polymer would be suitable for other polymer applications.

Example 6

| Ingredients | Percent | Amount Charged | Staged Adds of PET |
|---|---|---|---|
| Bis-diethylene glycol isophthalate | 11.42 | 36.84 | |
| Glycerine-25 | 11.46 | 22.92 | |
| Trimethylol propane | 7.00 | 14.00 | |
| Tyzor TPT | 0.01 | 0.02 | |
| PET in pellet form, crystallized | 70.11 | 140.22 | 1-15 |
| | | | 2-15 |
| | | | 3-20 |
| | | | 4-20 |
| | | | 5-25 |
| | | | 6-25 |
| | | | 7-20.22 |
| Total | 100.00 | 200.00 | 140.22 |

The bis-diethylene glycol isophthalate, the glycerine-25, the trimethylol propane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a clear, homogeneous reaction mass was achieved. After bringing up the temperature on the last add to 250° C. it was held for 10 minutes and then a 20 minute vacuum at 250° C. was completed before cooling.

This reaction was much faster than previous ones. The trimethylol propane appeared to transesterify easily with the PET, and to act as a better solvent in the initial stages. After all adds were completed, the initial viscosity was 3 poise at 175° C. and after a vacuum of 20 minutes at 250° C. it was 7 poise at 175° C. This material seemed to be less crystalline which points to either molecular weight or cross-link density helping to prevent crystallization.

Example 7

| Ingredients | Percent | Amount Charged | Staged Adds of PET |
|---|---|---|---|
| Cyclohexane dimethanol | 12.50 | 27.50 | |
| Ethoxylated glycerine | 12.50 | 27.50 | |
| Tyzor TPT | 0.01 | 0.02 | |
| PET in pellet form, crystallized | 74.99 | 164.98 | 1-15 |
| | | | 2-15 |
| | | | 3-20 |
| | | | 4-20 |
| | | | 5-25 |
| | | | 6-30 |
| | | | 7-39.98 |
| Total | 100.00 | 220.00 | 164.98 |

The cyclohexane dimethanol, the ethoxylated glycerine, and the Tyzor TPT were added to the reaction vessel and heated to 200° C. The PET was added in stages with each stage brought up to 250° C. and allowed to become homogeneous and clear before the next stage. After all the PET was added the polymer was kept at 250° C. for an additional 1 hour to insure equilibrium and homogeneity of the polymer.

This reaction proceeded without problems. The polymer had an initial viscosity of 3 poise at 175° C. The cyclohexane dimethanol, a known decrystallizer for PET, was added to lower the crystallinity. Surprisingly, the addition did not appear to lower the crystallization temperature, and did not appear to lower the isophthalates and cross-link density, when compared to the polymer produced in accordance with Example 4. This material was easy to grind into a powder and fuse again with temperature. A possible advantage with the higher crystalline material would be to produce a fusible coating or thermoforming polymers or compositions that could be used alone or in combination with other reactive or protective ingredients to provide a coating or thermoforming composition that had lower glass transition temperatures but was still a powder at room temperatures. This formula would be useful as a compound for fusible coatings or thermoforming applications.

Example 8

| Ingredients | Percent | Amount Charged | Staged Adds of PET |
|---|---|---|---|
| Polypropylene glycol | 18.75 | 41.25 | |
| Trimethylolpropane | 6.24 | 13.73 | |
| Tyzor TPT | 0.01 | 0.02 | |
| PET in pellet form, crystallized | 75.00 | 165.00 | 1-15 |
| | | | 2-15 |
| | | | 3-20 |
| | | | 4-25 |
| | | | 5-25 |
| Total | 100.00 | 220.00 | 100.00 |

The polypropylene glycol (M.W. 1000), the trimethylol propane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous reaction mass was achieved from the previous add. After only 100 grams of PET had been added the viscosity of the polymer seemed to be growing too rapidly.

This reaction was different in that a clear phase after the PET adds was never achieved. The polypropylene glycol may have had some solubility problems, which may have had an effect on the reactivity of the secondary hydroxyl group. The reaction resulted in the synthesis of a gelled polymer suspended in the polypropylene glycol. Once the material was removed from the flask the gelled polymer separated from the polypropylene glycol. This polymer, composed of trimethylolpropane and PET, was strong, resilient, rubber-like and non-crystalline. The viscosity was greater than 100 Poise at 200° C. The cross-link density was so high that the molecular weight was essentially approaching infinity rapidly, and the presence of the polypropylene glycol as a separate phase was beneficial.

Hot melt adhesive are polymers that have good adhesion usually to a variety of substrates. They have relatively low melting point and set up quickly to resilient but strong polymers.

Example 9

| Ingredients | Percent | Amount Charged | Staged Adds of PET |
|---|---|---|---|
| Ethoxylated Glycerine | 18.75 | 41.25 | |
| Trimethylolpropane | 6.24 | 13.73 | |
| Tyzor TPT | 0.01 | 0.02 | |
| PET in pellet form, crystallized | 75.00 | 165.00 | 1-25 |
| | | | 2-25 |
| | | | 3-25 |
| | | | 4-25 |
| | | | 5-25 |
| | | | 6-25 |
| | | | 7-15 |
| Total | 100.00 | 220.00 | 165.00 |

The ethoxylated glycerine, the trimethylol propane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous. All of the PET was added without difficulties.

This reaction was far better than using polypropylene glycol or glycerine in that the extra ethylene oxide on the glycerine not only produced easily accessible primary hydroxyls, but also seemed as more of a solvent for the PET. Clear phases at each add were easy to achieve. The viscosity after the final PET had been added was 6 Poises at 175° C. but went to 10 Poise after a 30 minute hold. This material had improved properties of resiliency, tenacity, adhesion to a variety of substrates, and a relatively low melting point. The resulting polymer would provide a good hot melt adhesive or in other adhesive applications.

Example 10

| Ingredients | Percent | Amount Charged | Staged Adds of PET |
|---|---|---|---|
| Ethoxylated Glycerine | 16.84 | 41.25 | |
| Trimethylolpropane | 5.60 | 13.73 | |
| Tyzor TPT | 0.01 | 0.02 | |
| PET in pellet form, crystallized | 77.55 | 190.00 | 1-25 |
| | | | 2-25 |
| | | | 3-25 |
| | | | 4-25 |
| | | | 5-25 |
| | | | 6-25 |
| | | | 7-15 |
| | | | 8-25 |
| Total | 100.00 | 245.00 | 190.00 |

The ethoxylated glycerine, the trimethylol propane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous. All of the PET was added without difficulties.

This reaction was similar to Example 8 only in that a larger percentage of PET was used. All conditions were the same and after the last add had reached 250° C., and cleared the reaction mass was held for an additional 30 minutes. The polymer had a viscosity of 13 Poise at 175° C. and was even stronger in properties to Example 8. The polymer had a tendency to crystallize if cooled too slowly.

Example 11

| Ingredients | Percent | Amount Charged | Staged Adds of PET |
|---|---|---|---|
| Polyethylene glycol, 400 M.W. | 70.00 | 154.00 | |
| Tyzor TPT | 0.05 | 0.11 | |
| PET in pellet form, crystallized | 29.95 | 65.89 | 1-30 |
| | | | 2-35.89 |
| Total | 100.00 | 220.00 | 65.89 |

The polyethylene glycol with a molecular weight of 400 and the Tyzor TPT were added to the reaction flask and the temperature was brought up to 200 C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous.

This reaction was run mainly to see if enough of the PET had broken down to provide water solubility. With this much ethylene oxide-containing material, water dispersibility should be achieved if the reaction is complete. The material dispersed in water easily and stayed clear for more than an hour. Since the hydroxyl value would be high on this polymer and it remained in a liquid state, it would make an excellent polyol for further reactions.

Example 12

The reaction product of Example 10 was further processed. The initial viscosity was low, 1 Poise at 175° C., so a vacuum was set up and the product was held for 1 hour total at 250° C. and with a 20 mm Hg vacuum. Samples were taken every 20 minutes. The initial viscosity became 3 Poise at 175° C. after 20 minutes of vacuum, 8 Poises after another 20 minutes, and 17 Poises after the final 20 minutes. The removal of the ethylene glycol as it was formed created larger molecular weights, and it is conceivable that vacuum could continue to be applied until the molecular weight was quite high.

Example 13

| Ingredients | Percent | Amount Charged | Staged Adds of PET |
|---|---|---|---|
| PEG 400 | 36.35 | 72.70 | |
| 20 + Alcohol | 9.06 | 18.12 | |
| Tyzor TPT | 0.01 | 0.02 | |
| PET in pellet form, crystallized | 54.58 | 109.16 | 1-40 |
| | | | 2-40 |
| | | | 3-29.16 |
| Total | 100.00 | 200.00 | 109.16 |

The PEG 400, 20+Alcohol (a 20 carbon linear chain alcohol), and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous but slightly less than clear reaction mass was achieved from the previous add. The reaction mass was held at 250° C. for an additional 30 minutes after the last add was clear and homogeneous. The PET seemed to dissolve and react without difficulties.

The 20+Alcohol was added to assess whether some chain termination with a longer chain aliphatic group would render the polymer less tacky at room temperature. This apparently worked quite well however upon standing some of the less massive unreacted 20+ Alcohol migrated to the surface. Although some reacted in apparently not all of the 20+ alcohol reacted. This migration to the surface could be useful in some applications and not desirable I in others. The polymer appeared to exhibit excellent adhesion when poured hot onto a substrate, and consequently, would make a good hot melt adhesive candidate.

Example 14

| Ingredients | Percent | Amount Charged | Staged Adds of PET |
|---|---|---|---|
| PEG 400 | 25.00 | 50.00 | |
| Ethoxylated Stearyl Alcohol | 5.00 | 10.00 | |
| Tyzor TPT | 0.01 | 0.02 | |
| PET in pellet form, crystallized | 69.99 | 139.98 | 1-20 |
| | | | 2-20 |
| | | | 3-25 |
| | | | 4-25 |
| | | | 5-30 |
| | | | 6-19.96 |
| Total | 100.00 | 200.00 | 139.96 |

The PEG 400, ethoxylated stearyl alcohol, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous. The PET seemed to dissolve and react without difficulties.

The ethoxylated stearyl alcohol was added to assess whether some termination with a longer chain aliphatic group would render the polymer less tacky at room temperature. An ethoxylated C-18 alcohol was selected to determine whether the ethoxylate group would add reactivity and solubility to the reaction over the unmodified alcohol of Example 12. The results of a clear melt and no apparent blooming of unreacted material to the surface confirmed that the ethoxylated stearyl alcohol added reactivity and solubility to the reaction. The polymer appeared to have improved adhesion when poured hot onto a substrate, but crystallized too rapidly and may not have been strong enough for some coating applications. The viscosity was 2 Poise at 175° C.

Example 15

| Ingredients | Percent | Amount Charged | Staged Adds of PET |
|---|---|---|---|
| PEG 400 | 20.00 | 40.00 | |
| Ethoxylated Stearyl Alcohol | 5.00 | 10.00 | |
| Trimethyolpropane | 5.00 | 10.00 | |
| Tyzor TPT | 0.01 | 0.02 | |
| PET in pellet form, crystallized | 69.99 | 139.98 | 1-20 |
| | | | 2-20 |
| | | | 3-25 |
| | | | 4-25 |
| | | | 5-30 |
| | | | 6-19.96 |
| Total | 100.00 | 200.00 | 139.96 |

The PEG 400, ethoxylated stearyl alcohol, trimethyolpropane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous. The PET seemed to dissolve and react without difficulties.

Adding the trimethylolpropane to the polymer of Example 13 improved the strength and resilience of the polymer. The polymer appeared to exhibit excellent adhesion when poured hot onto a substrate and was approaching good film strength. Upon setting some crystallization occurred. The viscosity was 5 Poise at 175° C.

Example 16

| Ingredients | Percent | Amount Charged | Staged Adds of PET |
|---|---|---|---|
| Ethoxylated Glycerine | 21.25 | 46.75 | |
| Ethoxylated Stearyl Alcohol | 2.30 | 5.06 | |
| Trimethylolpropane | 7.17 | 15.77 | |
| Tyzor TPT | 0.01 | 0.02 | |
| PET in pellet form, crystallized | 69.27 | 152.40 | 1-20 |
| | | | 2-20 |
| | | | 3-25 |
| | | | 4-25 |
| | | | 5-30 |
| | | | 6-32.4 |
| Total | 100.00 | 220.00 | 152.40 |

The ethoxylated glycerine, ethoxylated stearyl alcohol, trimethylolpropane, and the Tyzor TPT were added to the reaction flask and the temperature was brought up to 200° C. as rapidly as possible. After the first staged add of PET and each subsequent add the temperature was brought up to 250° C. rapidly with the rheostat set on 80% after a homogeneous and clear reaction mass was achieved from the previous add. The reaction mass was held at 250° C. for an additional 30 minutes after the last add was clear and homogeneous. A vacuum was pulled for 10 minutes. The PET seemed to dissolve and react without difficulties.

The ethoxylated glycerine was added to provide additional branched sites for strength characteristics through the increase of cross-link density, when compared with the polymer prepared in accordance with Example 14. The results showed that this addition did provide a slight boost in viscosity to 5 Poise at 175° C. The viscosity increase is believed to be attributable to an increase in molecular weight. The polymer was tough and resilient and slightly less crystalline than the polymer prepared in accordance with Example 14. A 10-minute vacuum of 20 in Hg was applied at 250° C. and the viscosity was 12 Poise at 175° C. Compounds were made using this polymer that proved to be suitable for hot melt coating applications.

Example 17

| Ingredients | Percent | Amount Charged | Staged Adds of PET |
|---|---|---|---|
| Polyethylene glycol, 400 M.W. | 70.00 | 154.00 | |
| PET in pellet form, crystallized | 30.00 | 66.00 | 1-30 |
| | | | 2-36 |
| Total | 100.00 | 220.00 | 66.00 |

The reaction of Example 11 was repeated using no Tyzor TPT to catalyze with. The polyethylene glycol with a molecular weight of 400 was added to the reaction flask and the temperature was brought up to 200° C. as rapidly as possible. After the first staged add of PET and each subsequent add the temperature was brought up to 270° C. rapidly with the rheostat set on 80% after a homogeneous and clear reaction mass was achieved from the previous add. The reaction mass was held at 270° C. for an additional 30 minutes after the last add was clear and homogeneous.

This Example was conducted to assess whether the PET would transesterify without a catalyst. The PET appeared to add in slower, and consequently, the temperature was increased 20° C., which appeared to somewhat offset the absence of catalyst. Transesterification will occur with some forms of PET even without additional catalyst.

Sizing Compositions—film forming polymers that can be dispersed or dissolved in water are widely used for sizing textile fibers and paper products. These polymers in many instances have to retain their solubility because they are later removed.

Example 18

| Ingredients | Percent | Amount Charged | Staged Adds of PET |
|---|---|---|---|
| Bis-diethylene glycol sulfo-isophthalate, sodium salt | 11.50 | 23.00 | |
| Glycerine ethoxylate | 9.00 | 18.00 | |
| Trimethyolpropane | 4.50 | 9.00 | |
| Tyzor TPT | 0.01 | 0.02 | |
| PET in pellet form, crystallized | 74.99 | 149.98 | 1-10 |
| | | | 2-15 |
| | | | 3-20 |
| | | | 4-20 |
| | | | 5-25 |

| Ingredients | Percent | Amount Charged | Staged Adds of PET |
|---|---|---|---|
| | | | 6-25 |
| | | | 7-25 |
| | | | 8-9.98 |
| Total | 100.00 | 200.00 | 149.98 |

The bis-diethylene glycol sulfo-isophthalate (sodium salt), the glycerine ethoxylate, the trimethylolpropane, and the Tyzor TPT were added to the reaction vessel and heated to 200° C. The PET was added in stages with each stage brought up to 250° C. before the next stage. After all the PET was added the polymer was kept at 250° C. for an additional 1 hour to insure equilibrium and homogeneity of the polymer.

This reaction proceeded without problems. The polymer had an initial viscosity of 3 poise at 175° C. A vacuum of 20 in Hg was applied for 10 minutes and the polymer's viscosity went to 12 Poise at 175° C. This resin dispersed easily in hot water. The bis-diethylene glycol sulfosiophthalate, sodium salt, was added to provide a water-soluble group to the polymer. This polymer would make a suitable candidate for sizing compositions, ink jet resins, and any film-forming compositions that require water dispersibility.

Higher molecular weight fiber or film—In the production of fibers or films, the viscosity, resiliency, or other properties of the molten resin should be high enough to allow further processing with the molten material. With many films, a certain degree of cross-link density is incorporated into the polymer to achieve this. It becomes necessary at times to approach the gellation point of the polymer in order to achieve these running properties. With the process of the preferred embodiments, one skilled in the art can approach the gellation point by selecting an appropriate cross-link density in the modifying monomer mix, thereby achieving unheard of properties with great accuracy. In fact, in many cases gellation is a desirable property to achieve high strengths and cohesive properties. With this process, and the proper choice of beginning multifunctional alcohols or esters, gellation can be approached with large quantities of the commercially available condensation polymer.

Example 19

| Ingredients | Percent | Amount Charged | Staged Adds of PET |
|---|---|---|---|
| PEG 400 | 5.52 | 11.04 | |
| Ethoxylated Stearyl Alcohol | 0.60 | 1.20 | |
| Trimethylolpropane | 1.86 | 3.72 | |
| Tyzor TPT | 0.01 | 0.02 | |
| PET in pellet form, crystallized | 92.01 | 184.02 | 1-5 |
| | | | 2-6 |
| | | | 3-8 |
| | | | 4-10 |
| | | | 5-15 |
| | | | 6-20 |
| | | | 7-20 |
| | | | 8-25 |
| | | | 9-25 |
| | | | 10-25 |
| | | | 11-25.02 |
| Total | 100.00 | 200.00 | 184.02 |

The PEG 400, ethoxylated stearyl alcohol, trimethylolpropane, and the Tyzor TPT were added to the reaction flask and the temperature was brought up to 200° C. as rapidly as possible. After the first staged add of PET and each subsequent add through add 7 the temperature was brought up to 250° C. rapidly with the rheostat set on 80% after a homogeneous and clear reaction mass was achieved from the previous add. Prior to add 8 the temperature of the reaction mass was raised to 270° C. to offset the increase in viscosity. After add 8 the reaction was returned to 270° C. After Add 9 the reaction mass was brought up to 290° C. and again back to 290° C. after add 10 and 11. The reaction mass was held at 250° C. for an additional 1 hour after the last add was clear and homogeneous.

It was difficult to stir such a small amount of modifying monomer mix with any amount of PET. A kettle designed to agitate small amounts better initially would be preferred. Therefore, the reactor utilized in this example required small initial adds and careful attention. No more PET was added because of the obvious viscosity increase that occurred with the last add of PET. The final polymer had a melt viscosity of greater than 100 Poise at 200° C. but was still movable at higher temperatures. One could easily draw out a fiber from the molten mass and continue to draw indefinitely. This was a good film and fiber forming polymer.

Polyols—The process described herein also can be used for making a variety of polyols. A polyol is generally a lower molecular weight material containing terminating hydroxyl groups that can take part in other reactions to form higher molecular weight materials. A common use for these polyols is in making polyurethane. Polyurethane is a rigid, semi-rigid, or flexible polymer that can be used to make a number of materials such as adhesives, insulating foam, foam structural items like shoe insoles, rubber-like structural items, and rigid structural items.

Example 20

| Ingredients | Percent | Amount mixed |
|---|---|---|
| Polyol of Example 17 | 48.79 | 20.03 |
| Polymethylene polyphenylpolyisocyanate | 49.65 | 20.38 |
| Water | 1.51 | 0.62 |
| Di-butyl tin laurate | 0.05 | 0.02 |
| Total | 100.00 | 41.05 |

The polyol of Example 17 was further reacted according to the formula above to produce a polyurethane foam. All the ingredients were mixed in a cup. The polymethylene polyphenylpolyisocyanate was added last to ensure good mixing. After a few minutes the reaction started and produced a volume of foam. Once cooled the foam was rigid, tough, and suitable for some structural foam applications.

Example 21

| Ingredients | Percent | Amount mixed |
|---|---|---|
| Polyol of Example 4 | 79.88 | 16.83 |
| Polymethylene polyphenylpolyisocyanate | 20.07 | 4.23 |
| Di-butyl tin laurate | 0.05 | 0.01 |
| Total | 100.00 | 21.07 |

The polyol of Example 4 was further reacted according to the formula above to produce a polyurethane. All the ingredients were mixed in a beaker after heating the polymer to 130° C. The polymethylene polyphenylpolyisocyanate was added last to ensure good mixing and mixed as rapidly as possible.

The reaction was quite rapid and vigorous stirring was conducted to obtain an adequate mixture of the components before the reaction started. Significant heat was produced. Once cooled, the polymer was extremely tough and would be suitable for some molding applications. This is about the maximum molecular weight polymer that could be mixed by hand. It would be easy to produce an article with even less of the polymethylene polyphenylpolyisocyanate and a higher molecular weight polymer if the mixing was carried out in an extruder.

Film forming, acid-terminated, water-dispersible compositions or powder coatings:

Example 22

The polymer from Example 14 was further processed by melting and pouring back into the reaction flask. Heating was continued until the polymer was 180 degrees C. An additional 10% of trimellitic anhydride was added to the 176.9 g. mass to get a final weight of 196.6 grams. The reaction mass was brought back to 180° C. and held for 1 hour.

The polymer produced from this further processing was higher in molecular weight and had a finished viscosity of 15 Poise at 175° C. It had a relatively high Tg and was easy to grind into a powder that could be refused with heat. The powder also dispersed into 70° C. hot water containing 1% ammonium hydroxide to make a 20% dispersion suitable as a water dispersible coating composition. This polymer would make a suitable candidate for sizing compositions, ink jet resins, and any film-forming compositions that require water dispersibility. Due to its relatively high glass transition temperature it also would make a good candidate for an acid-terminated powder coating.

Film Compositions from Polyethylene Naphthalate (PEN)—PEN is a relatively new polymer. Prior to the construction of a manufacturing site by Amoco specifically for the manufacture of NDC, or dimethyl-2,6-naphthalenedicarboxylate the intermediate for PEN, the cost of PEN was prohibitive for all but the most demanding applications. Today, however, many items of commerce utilize PEN.

There are advantages of using PEN over PET for packaging of certain articles. For example, the barrier properties of PET are not believed to be adequate for certain applications where barrier properties are desirable. PET has been used for bottling beer, but because of the high permeability of oxygen, it sometimes causes the flavor to deteriorate rapidly. There have been several products where PET is laminated with a high oxygen barrier film to try to compensate for this. PEN has the needed barrier properties. This and the fact that it can take higher temperatures that are used to pasteurize some liquids, it is expected that the use of PEN will increase over the next decade.

The process of the embodiments described herein can make use of PEN as the commercially available condensation polymer. The temperatures usually required to use this process with PEN are greater than that of PET, and typically are on the order of 250 to 280° C.

Example 23

| Ingredients | Percent | Amount Charged | Staged Adds of PET |
|---|---|---|---|
| PEG 400 | 20.00 | 40.00 | |
| Trimethylolpropane | 5.00 | 10.00 | |
| Tyzor TPT | 0.01 | 0.02 | |
| PEN in pellet form, crystallized | 74.99 | 149.98 | 1-10 |
| | | | 2-10 |
| | | | 3-20 |
| | | | 4-20 |
| | | | 5-25 |
| | | | 6-25 |
| | | | 7-30 |
| | | | 8-9.98 |
| Total | 100.00 | 200.00 | 149.98 |

The PEG 400, trimethylolpropane, and the Tyzor TPT were added to the reaction flask and the temperature was brought up to 200° C. as rapidly as possible. After the first staged add of PEN the temperature was brought to 260° C. and produced some amount of foam due to boiling of the monomer mix. This subsided and with each subsequent add through add 8 the temperature was brought up to 265° C. rapidly with the rheostat set on 80% after a homogeneous and clear reaction mass was achieved from the previous add. After add 8 the reaction was returned to 280° C. and held for 1 hour. This material seemed to behave similar to PET but required higher temperatures for transesterification to occur rapidly. The finished polymer was flexible and a good film forming material.

In the following examples, the process disclosed herein was performed in a small reactor suitable for making enough material to compound and run onto carpet.

Example 24

| Ingredients | Percent | Amount Charged | Staged Adds of PET |
|---|---|---|---|
| Ethoxylated Glycerine | 16.86 | 26.30 Pounds | |
| Trimethylolpropane | 5.58 | 8.70 Pounds | |
| Tyzor TPT | 0.01 | 7.0 grams | |
| PET in pellet form, crystallized | 77.55 | 121.00 Pounds | 1-6 lbs |
| | | | 2-8 lbs |
| | | | 3-9 lbs |
| | | | 4-10 lbs |
| | | | 5-12 lbs |
| | | | 6-15 lbs |
| | | | 7-18 lbs |
| | | | 8-21 lbs |
| | | | 9-22 lbs |
| Total | 100.00 | 156 Pounds | 121 Pounds |

The ethoxylated glycerine, the trimethylol propane, and the Tyzor TPT were added to the reactor and the temperature was brought up to 430° F. as rapidly as possible. After the first staged add of PET the temperature was brought up to 450° F., after the 2nd and 3rd add up to 460° F., after the $4^{th}$ and $5^{th}$ add up to 470° F., after the $6^{th}$ add up to 475° F., after the $7^{th}$ and $8^{th}$ add up to 480 F, and after the $9^{th}$ and final add back up to 490° to 500° F. for 1 hour. All of the PET was added without difficulties.

The reaction went very similar to the lab reactions. The hot melt polymer produced was further compounded into a backing material suitable for carpet backing. The material was run and the carpet samples were tested and found to be suitable for commercial applications.

Example 25

| Ingredients | Percent | Amount Charged | Staged Adds of PET |
|---|---|---|---|
| Ethoxylated Glycerine | 18.00 | 24.8 Pounds | |
| Trimethylolpropane | 4.87 | 6.7 Pounds | |
| Ethoxylated Stearyl Alcohol | 3.49 | 4.8 Pounds | |
| Tyzor TPT | 0.01 | 7.0 grams | |
| PET in pellet form, crystallized | 73.63 | 101.4 Pounds | 1-6 lbs |
| | | | 2-8 lbs |
| | | | 3-9 lbs |
| | | | 4-10 lbs |
| | | | 5-12 lbs |
| | | | 6-15 lbs |
| | | | 7-18.4 lbs |
| | | | 8-23 lbs |
| Total | 100.00 | 137.7 Pounds | 101.4 Pounds |

The ethoxylated glycerine, trimethylol propane, ethoxylated stearyl alcohol, and the Tyzor TPT were added to the reactor and the temperature was brought up to 430° F. as rapidly as possible. After the first staged add of PET the temperature was brought up to 450° F., after the 2nd and 3rd add up to 460° F., after the 4$^{th}$ and 5$^{th}$ add up to 470° F., after the 6$^{th}$ add up to 475° F., after the 7$^{th}$ add up to 480° F. and after the 8$^{th}$ and final add back up to 490° to 500° F. for 1 hour. All of the PET was added without difficulties and produced a clear, homogeneous melt.

The hot melt polymer made from this example was further processed into a compound and applied to the back of carpet. The finished product was ideal for a carpet backing material with good properties of tuft bond, flexibility, Velcro, etc. The polymer made above was sent to a laboratory to run a GPC (gell permeation chromatography) for molecular weights. The molecular weight was determined to be 12,579 with a polydispersity of 4.64.

The embodiments have been described with reference to particularly preferred embodiments and examples. Those skilled in the art will appreciate that various modifications may be made to the embodiments without significantly departing from the spirit and scope thereof.

What is claimed is:

1. A method of making a polymer comprising:
providing a condensation polyester comprising a plurality of constituent monomers and having a first molecular weight;
providing a modifying monomer selected from the group consisting of butanol, hexanol, lauryl alcohol, decanol, glycerine, trimethylolpropane, neopentyl glycol, ethylene glycol, sorbitol, pentaerythritol, cyclohexane dimethanol, stearyl alcohol, adipic acid, lauric acid, palmitic acid, stearic acid, oleic acid, behenic acid, linolenic acid, succinic acid, maleic acid, maleic anhydride acid, butanoic acid, phthalic acid, phthalic anhydride acid, isophthalic acid, terephthalic acid, trimellitic anhydride acid, diethylene glycol, triethylene glycol, polyethylene glycol 200, polyethylene glycol 400, polyethylene glycol 600, polyethylene glycol 800, polyethylene glycol 1000, ethoxylate condensates comprising 1 to 25 moles of ethylene oxide thereof, esters thereof, di-esters thereof, tri-esters thereof, amines thereof, amides thereof, and combinations thereof; and
without depolymerizing the condensation polyester into its constituent monomers, transesterifying the modifying monomer with staged addition of a predetermined amount of the condensation polyester,
wherein the transesterifying produces a final polymer having a second molecular weight that is greater than the first molecular weight.

2. The method of claim 1, wherein the modifying monomer comprises a hydroxyl group.

3. The method of claim 1, wherein the modifying monomer comprises an ester group.

4. The method of claim 1, wherein the condensation polyester is polyethylene terephthalate.

5. The method of claim 1, wherein:
the final polymer is a polyol, and
the method further comprises reacting the polyol with an isocyanate to produce a polyurethane.

6. The method of claim 1, further comprising applying a vacuum during the transesterifying.

7. The method of claim 1, further comprising removing ethylene glycol during the transesterifying.

8. The method of claim 1, further comprising reacting the final polymer with an anhydride to produce an acid-terminated polymer.

9. The method of claim 1, wherein the transesterifying is carried out at a temperature of about 150° C. to about 350° C.

10. The method of claim 1, wherein the transesterifying is carried out at a temperature of about 200° C. to about 290° C.

11. The method of claim 1, wherein the transesterifying is carried out for a period of less than 5 hours.

12. The method of claim 1, wherein the condensation polyester is provided in an amount of about 30 to about 96 percent by weight of the final polymer.

13. The method of claim 1, wherein the condensation polyester is provided in an amount of about 60 to about 80 percent by weight of the final polymer.

14. The method of claim 1, wherein the modifying monomer is not one of the constituent monomers.

15. The method of claim 1, further comprising:
applying the final polymer to a back of a carpet to form a carpet backing.

16. A method of making a polymer comprising:
providing polyethylene terephthalate comprising a plurality of constituent monomers and having a first molecular weight;
providing trimethylol propane; and
without depolymerizing the polyethylene terephthalate into its constituent monomers, providing a plurality of staged additions of the polyethylene terephthalate and transesterifying the trimethylol propane to produce a final polymer having a second molecular weight that is greater than the first molecular weight,
wherein the transesterifying is carried out at a temperature of about 200° C. to about 290° C. and for a period of less than 5 hours.

17. A method of making a polymer comprising:
providing a condensation polyester comprising a plurality of constituent monomers and having a first molecular weight;
providing a modifying monomer selected from the group consisting of butanol, hexanol, lauryl alcohol, decanol, glycerine, trimethylolpropane, neopentyl glycol, ethylene glycol, sorbitol, pentaerythritol, cyclohexane dimethanol, stearyl alcohol, adipic acid, lauric acid, palmitic acid, stearic acid, oleic acid, behenic acid, linolenic acid, succinic acid, maleic acid, maleic anhydride acid, butanoic acid, phthalic acid, phthalic anhydride acid, isophthalic acid, terephthalic acid, trimellitic anhydride acid, diethylene glycol, triethylene glycol, polyethylene glycol 200, polyethylene glycol 400, polyethylene glycol 600, polyethylene glycol 800, polyethylene glycol 1000, ethoxylate condensates comprising 1 to 25 moles of ethylene oxide thereof, esters thereof, di-esters thereof, tri-esters thereof, amines thereof, amides thereof, and combinations thereof; and having a molecular weight of less than 1500 Daltons; and without depolymerizing the condensation polyester into its constituent monomers, transesterifying the modifying monomer with a predetermined amount of the condensation polyester, wherein the transesterifying produces a final polymer having a second molecular weight that is greater than the first molecular weight.

18. A method of making a polymer consisting of:

providing a condensation polyester comprising a plurality of constituent monomers and having a first molecular weight;

providing a modifying monomer comprising more than two reactive groups; and without depolymerizing the condensation polyester into its constituent monomers, transesterifying the modifying monomer with a predetermined amount of the condensation polyester, wherein the transesterifying produces a final polymer having a second molecular weight that is greater than the first molecular weight.

* * * * *